United States Patent Office 3,414,426
Patented Dec. 3, 1968

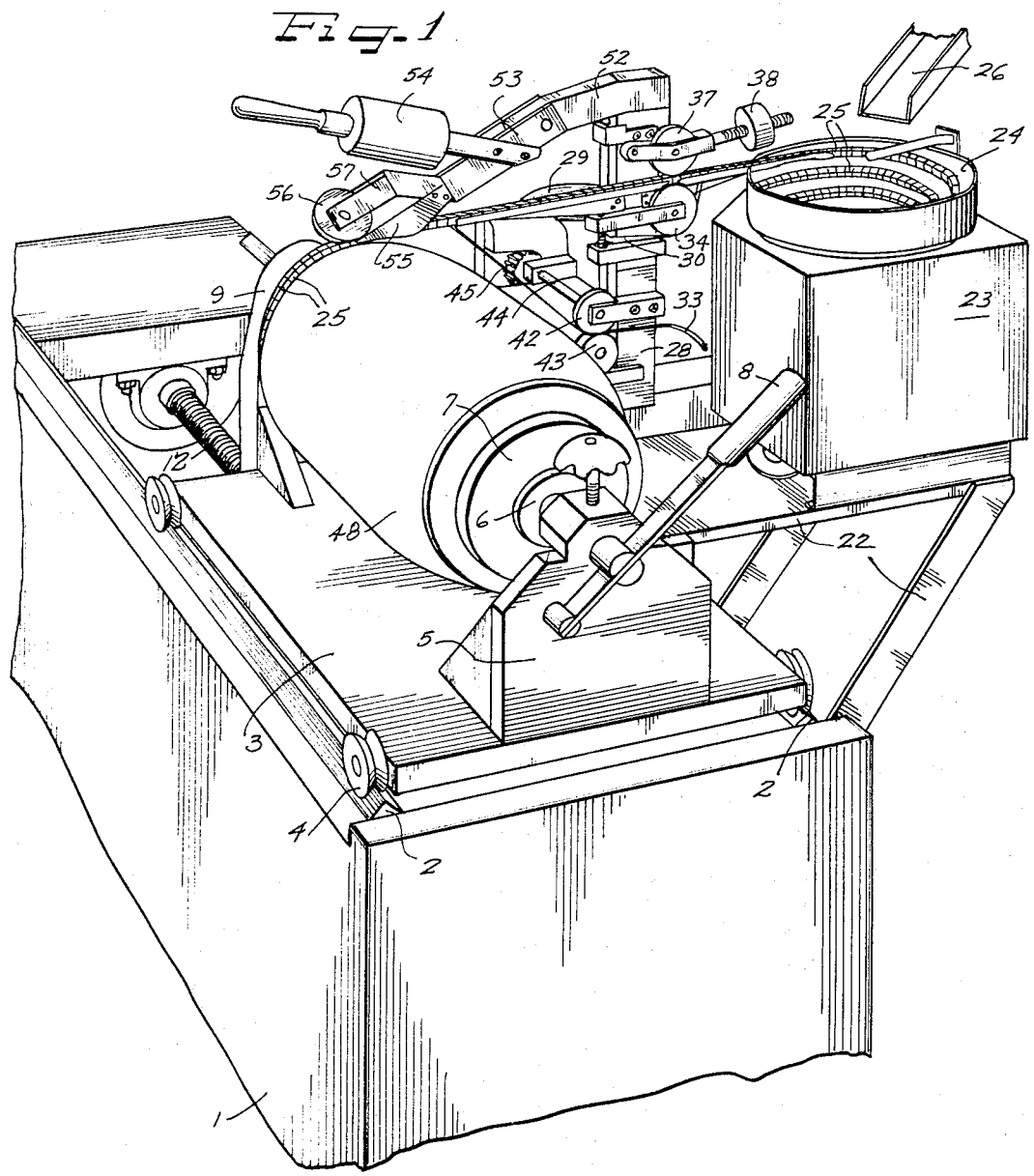

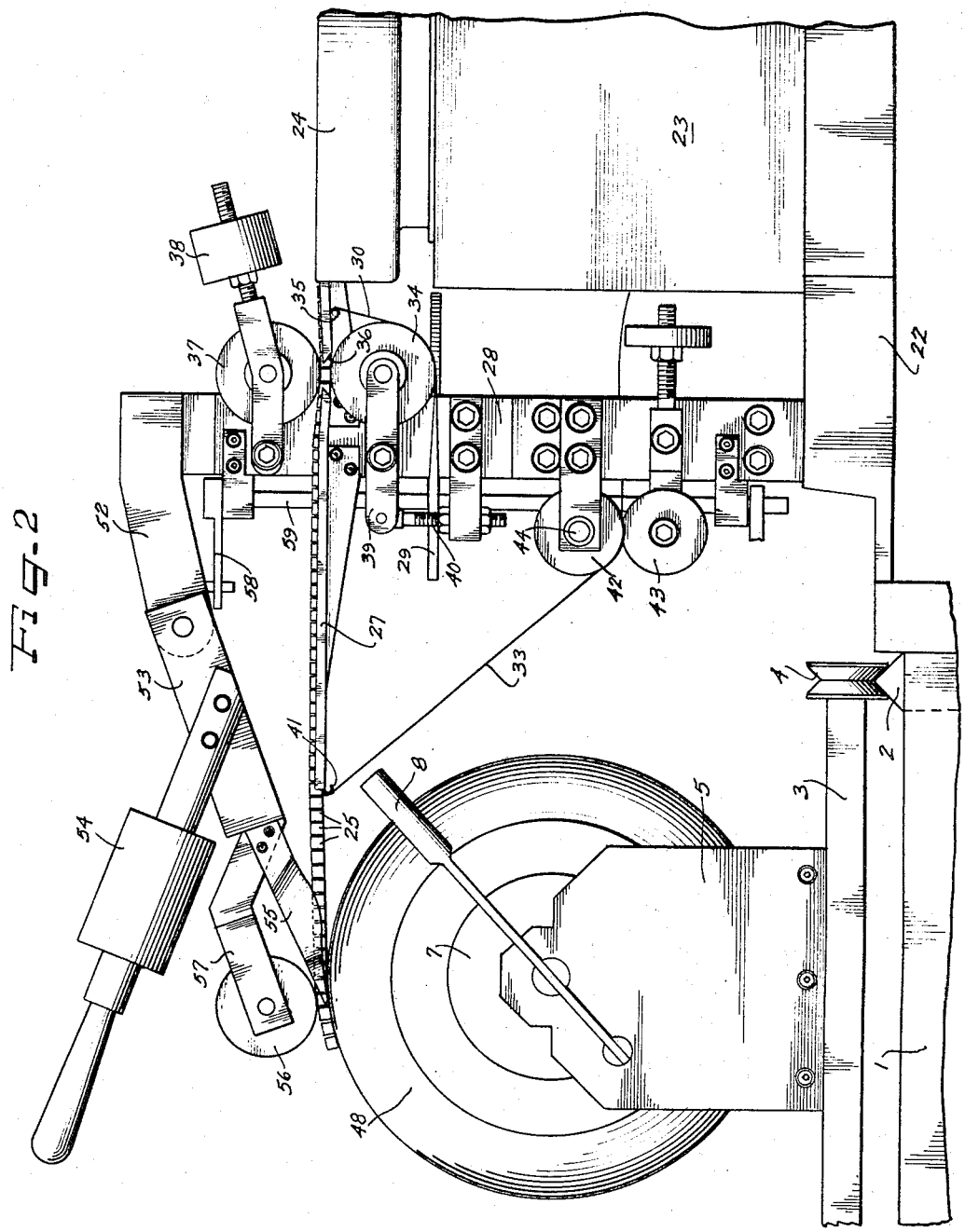

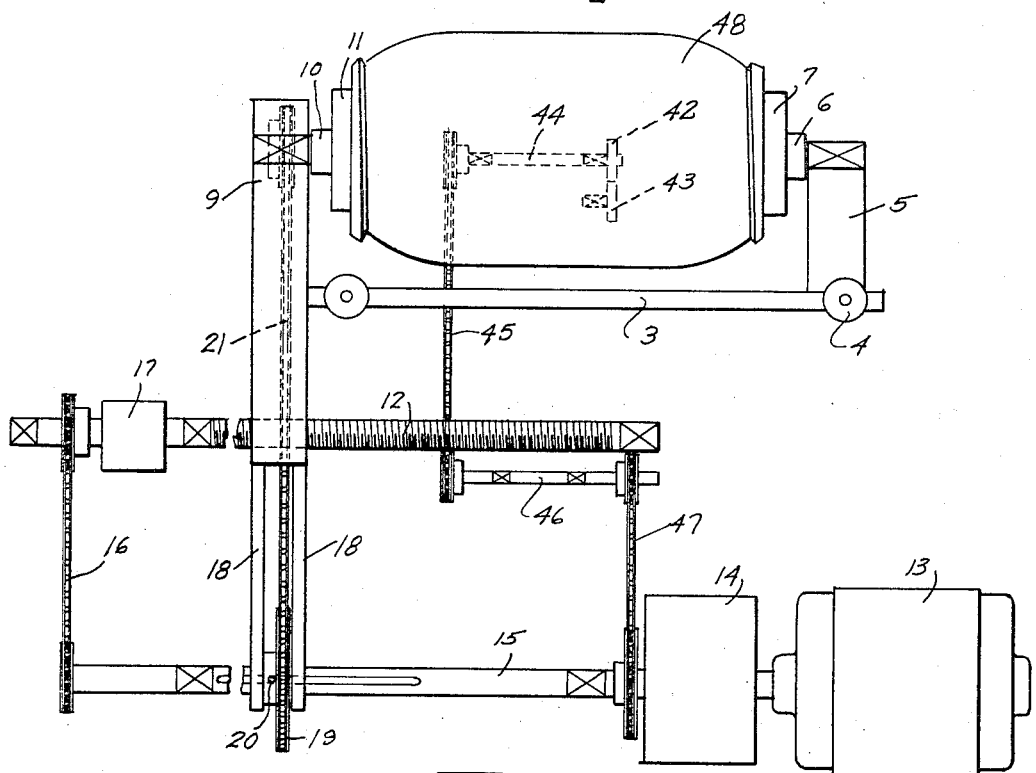

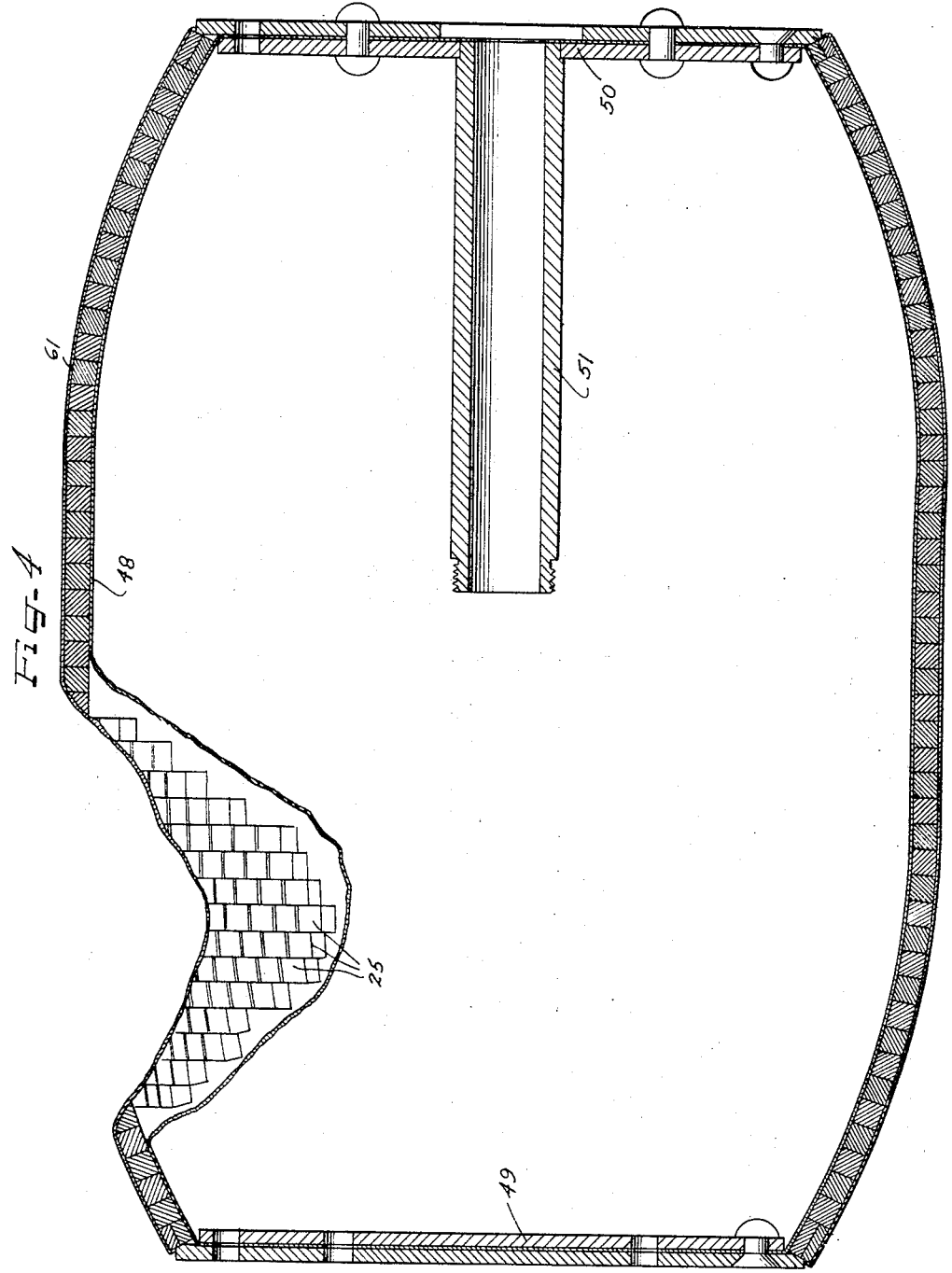

3,414,426
MEANS FOR AND METHOD OF APPLYING MOSAIC TO CURVATE SURFACES
Robert O. Hughes and Lawrence D. Orser, Cedar Falls, Iowa, and Nicholas L. Etten, deceased, late of Cedar Falls, Iowa, by Eileen Etten, executrix, Cedar Falls, Iowa, assignors to Chamberlain Manufacturing Corporation, a corporation of Iowa
Filed Aug. 21, 1959, Ser. No. 835,817
16 Claims. (Cl. 117—18)

This invention relates to improvements in means for and a method of applying mosaic to curvate surfaces, the invention being highly desirable for the continuous and automatic application of small pieces or pellets to objects having curved surfaces to form a mosaic covering over the object, although the invention may have other uses and purposes as will be apparent to one skilled in the art.

The instant invention is highly desirable for use in connection with the decorating of various objects having curvate surfaces such as jars, vases, and numerous other objects. It is not necessary that the object being decorated with the mosaic has a constant diameter throughout, but it may vary in size from one end to the other. More specifically, the instant invention is extremely desirable for the application of pellets to warheads, such warheads being utilized on various forms of projectiles or missiles, particularly rocket type missiles having mechanism therein by which the missile may seek out and follow its target, the missiles being mainly utilized for destruction of flying objects in the air.

In the past, extreme difficulty has been experienced in the making of an object having a curved surface and carrying thousands of small pieces or pellets on that curved surface. At first, this was accomplished by hand and obviously the production expense was enormous. Further, the production rate was objectionably slow.

Accordingly, it is an object of the instant invention to provide means for automatically, quickly, and very economically covering the surface of a curvate object with mosaic pieces or pellets and securing them to the surface of the object.

Another object of this invention resides in the provision of means for feeding a steady stream of mosaic pieces or pellets directly to the curvate surface of an object and firmly applying such pieces or pellets to the surface of the object while the object is rotated and slowly moved along a predetermined path.

Another feature of the instant invention is the provision of means for automatically and rapidly feeding a stream of separate pieces or pellets to the curvate surface of an object and adhesively securing those pellets onto the object.

Also a feature of the invention resides in the provision of mechanism for automatically aligning pieces or pellets on one side of a strip of double-faced adhesive tape, and then feeding the strip carrying the pellets directly to the curvate surface of a moving object and adhesively uniting the strip to the surface of the object.

It is also an object of this invention to provide a new and novel method of applying mosaic to the surface of an object.

Still another feature of the invention resides in the provision of a new and novel method of automatically and continuously feeding aligned pellets or pieces to the surface of a moving object, adhesively joining the pellets to the object, and then filling the interstices between adjacent pellets with a mtrix.

While some of the more salient features, characteristics and advantages of the instant invention have been above pointed out, others will become apparent from the following disclosures, taken in conunction with the accompanying drawings, in which FIG. 1 is a fragmentary perspective view of mechanism embodying principles of the instant invention, showing the same associated with an object to which mosaic is being applied;

FIG. 2 is a fragmentary end elevational view of the structure of FIG. 1, somewhat enlarged;

FIG. 3 is a diagrammatic elevational view, with parts removed, illustrating the drive of the mechanism;

FIG. 4 is a greatly enlarged vertical sectional view through a completed warhead made on the mechanism and by the method embodied in the instant invention, with parts broken away;

FIG. 5 is a greatly enlarged fragmentary vertical sectional view through the structure of FIG. 4;

FIG. 6 is a perspective view of one of the pieces or pellets forming the mosaic on the structure of FIG. 4, showing the pellet in its condition when applied; and FIG. 7 is a perspective view of a pellet showing the same in condition after the warhead has been exploded.

As shown on the drawings:

For purposes of convenience and clarity, the instant invention is herein disclosed and described in connection with the making of a warhead carrying a mosaic of several thousands of pieces or pellets. For example, a warhead approximating one foot in diameter and fifteen inches in length will carry in the neighborhood of 4500 pellets on its surface. The pellets are preferably cubical in shape and may satisfactorily be severed from steel wire, square in cross-section. The pellets may be of any desired or suitable size, and for warheads of the size above mentioned, pellets measuring 0.3125 inch along each edge are satisfactory.

Briefly, the mechanism illustrated automatically aligns the pellets, secures them to one side of a strip of double-faced adhesive tape, feeds the tape carrying the pellets to the surface of an empty warhead shell, and spirally winds the tape onto the shell with the pellets substantially abutting each other. The weight of the shell may be determined by the spacing between the pellets.

In describing the illustrated structure, it will be assumed that suitable frame struts and supports are utilized where necessary, adequate shaft bearings are provided, and interconnections of a known character are utilized where necessary.

The illustrated embodiment of the instant mechanism comprises a base support or housing 1 on the bed of which is mounted a pair of opposed triangular rails 2—2 forming a track for a carriage 3 equipped with wheels 4 shaped complementally to the rails 2—2. Mounted upon one end of the carriage 3 is a tailstock 5 carrying a dead spindle 6 and a chuck 7, if the latter is necessary, which are controlled by means of a handle 8. On the opposite end of the carriage 3 is a headstock 9 carrying a live spindle 10 and a chuck 11 should the same be necessary. This headstock 9 forms an elongated housing as seen best in FIG. 3 which has a portion engaged on an elongated screw 12 mounted within the supporting housing 1. As the screw 12 turns, the headstock 9 together with the carriage 3 moves along the rails 2—2.

Again with reference to FIG. 3, it will be seen that the drive may be furnished by a suitable prime mover such as an electric motor 13 operating through a gear reduction box 14 to rotate a drive shaft 15, these parts all being within the supporting housing 1. The screw 12 is driven from the main drive shaft 15 by means of a suitable chain and sprocket assembly 16, or the equivalent, and a second gear reduction assembly enclosed in a casing 17. In order to acquire rotation of the spindles of the lathe stocks, the housing 9 is provided with a pair of depending arms 18—18, spaced apart to extend on each side of a sprocket 19 keyed to the shaft 15 as indicated 20, and slidable along the shaft with the movement of the carriage 3. A suitable chain and top sprocket assembly 21 effects the drive of the live lathe stock spindle from the slidable sprocket 19.

Mounted upon a sub-frame structure 22 connected with the base housing 1 is a known form of electrical vibrator 23 on which is an open-topped container 24 that may receive a supply of pellets or pieces 25 from a delivery chute 26 or in any other suitable manner. The inside wall of the vibrator container 24 is provided with a helical track, and upon operation the pellets assume alignment and automatically climb the spiral track and exit from the top of the container 24. As the pellets exit from the open-topped container 24, they enter a narrow channel track 27 carried by an upright column or post 28 on the sub-frame 22. This channel track 27 is preferably approximately the width of a single pellet, so that as the pellets are discharged in alignment from the vibrator container, they will follow along the channel track 27 in single file and substantially in contact with each other.

Rotatably mounted on suitable means on the other side of the column 28 is a supply roll 29 of double-faced adhesive tape 30. As seen best in FIG. 5, this tape 30 has an adhesive spread 31 on one side thereof and a similar pressure-sensitive adhesive spread 32 on the other side. As the tape leaves the supply 29, the one face of the tape is covered by a temporary protective strip 33. As is apparent from the showings in FIGS. 1 and 2, the supply roll 29 is horizontally disposed, rotating around a vertical axis, and the tape is turned or twisted adjacent the underside of a pressure roll 34 so as to expose the uncovered adhesive face. As the tape unwinds and passes around the lower portion of the roll 34, it then goes over a curvate guide 35 and travels along the bottom of the channel track 27 beneath the stream of pellets. Through an opening 36 in the track, pressure contact is established between the lower roll 34 and an upper roll 37 weighted as indicated at 38. The upper roll presses on the upper surface of these pellets and forces them firmly on the exposed adhesive face of the tape 30 against the back pressure of the lower roll 34 on the covered face of the tape. Thus, the pellets are firmly joined to one face of the tape and thereafter travel with the tape as a unit. The lower roll 34 is preferably mounted on a pivot arm 39 which may be adjusted by a bolt and nut arrangement as indicated at 40 so that the rolls may readily accommodate pellets of different sizes. At the outer end of the channel track 27, another curvate guide 41 is provided and the protective strip 33 is brought downward around this guide and gradually peeled off the adhesive surface on the underside of the tape 30. This protective strip passes between a pair of rolls 42 and 43, and delivered to any suitable disposal point. The upper of these rolls, namely the roll 42, is preferably mounted on a shaft 44 which, as seen best in FIG. 3, may be driven by a chain and sprocket assembly 45 from an auxiliary shaft 46 in the base housing 1, which is in turn driven by a chain and sprocket assembly 47 from the main drive shaft 15.

When the machine is in operation, a warhead in the form of a hollow shell 48 is mounted for rotation between the headstock 9 and the tailstock 5 of the machine. This warhead shell is best seen in FIG. 4, and is reinforced at one end as indicated at 49, reinforced at the opposite end as indicated at 50, and provided with a charging tube 51 extending partially within the shell. At the start of the operation, the vibrator 23 is actuated and the tape 30 is manually threaded through the machine, a portion of the backing strip 33 brought down and threaded between the rolls 42 and 43, and the leading end of the tape carrying a line of pellets is pressed into contact with the warhead 48 immediately adjacent one end thereof. The machine is then actuated by the motor 13, and as the warhead rotates, the tape carrying its line of pellets is spirally wound around the shell.

Mounted on the top of the upright 28 is an arm 52 to which is pivoted another arm 53 carrying a weight 54 urging the same downwardly. Projecting from the free end of the arm 53 is an aligning blade 55, and also a pressure roller 56 carried on an extension 57. As seen best in FIG. 1, the aligning blade 55 keeps each spiral of tape and its line of pellets pressed against the previously wound spiral, while the pressure roller 56 causes firm adherence of the tape to the warhead shell 48 by rolling on top of each spiral of pellets. The aligning and pressing mechanism just described is preferably stabilized by an arm 58 carried on a rod 59 extending upwardly along the upright 28, as seen best in FIG. 2. Any suitable form of automatic clutch mechanism may be utilized in the machine to vary the speed of translation of the warhead or other object to which mosaic is being applied, should the same be necessary by virtue of major variances in diameter of the object.

As seen best in FIG. 4, the pellets in each row are preferably in staggered relationship with the pellets in the two adjacent rows.

After the warhead shell 48 has been completely covered with the pellets, and it will be noted that the operation of the machine is continuous, there being a steady stream of pellets moving onto the warhead, the warhead is removed from the machine and a matrix 60 (FIG. 5) comprising a suitable thermosetting plastic, a polyester resin being satisfactory for this purpose, may readily be sprayed over the pellets on the warhead shell, and as seen in FIG. 5 fills the spaces between the pellets and it also provides a covering over the top of the pellets. This matrix holds the pellets firmly in position during the application of a skin-like cover 61, seen in FIG. 4. While the warhead shell 48 is preferably steel, the cover 61 is preferably aluminum and is spun onto the warhead to enclose the pellets, the skin-like cover being turned into a groove at each end of the warhead to make the same water and gastight. Satisfactorily, the cover 61 may be 0.025 inch at the start, and during the spinning operation may be reduced in thickness to approximately 0.01 inch.

In FIG. 6 we have illustrated a pellet 25 in its original condition as applied to the warhead shell 48. The pellet is substantially a perfect cube in shape. In FIG. 7 we have illustrated a pellet after the warhead has been exploded, and it will be noted that this pellet, designated 25a, has assumed a shape approximating a rhombohedron having very sharp points at the corners, as indicated at 62.

Obviously, in the event some other object is to be decorated with mosaic, the matrix may be used or not used as found desirable, and there is no need for the skin cover 61.

An alternative method of applying the pieces or pellets 25 to the curvate surface of an object embodies the step of feeding the pellets directly down a chute onto the object which has been previously coated with a mastic or suitable adhesive, thus dispensing with the use of the double-faced adhesive tape. However, should it be necessary to stop the machine for awhile before the object is completely covered with the mosaic, there is a risk involved of the adhesive or mastic drying, which risk is not present when the double-faced adhesive tape is utilized.

From the foregoing, it is apparent that we have provided a simple and economical as well as time-saving method of applying mosaic to an object. It is also apparent that we have provided fast operating automatic mechanism for the purpose, wherein the pellets or pieces are fed in a continuous stream directly to the object, and may be applied over substantially any contour or surface variation regardless of changes in diameter or size of the object from one end to the other.

It will be understood that modifications and variations may be effected without departing from the scope of the novel concepts of the present invention.

What is claimed is:

1. The method of applying mosaic to a curvate surface, including the steps of rotating an object having a curvate surface, feeding pellets aligned in single file in a stream to the external surface of the object and adhesively attaching the pellets to the object, and spraying a plastic material over and between the attached pellets.

2. The method of applying mosaic to a curvate surface, including the steps of rotating an object having a curvate surface, feeding pellets aligned in single file in a stream to the external surface of the object and adhesively attaching the pellets to the object, and spraying a plastic material over and between the attached pellets, and spinning a thin metallic cover over the sprayed pellets.

3. The method of applying mosaic to a curvate surface, including the steps of rotating an object having a curvate surface, feeding pellets aligned in a stream to the external surface of the object for application thereto in a direction circumferentially of the rotating object, causing relative movement longitudinally of the object between the object and point of pellet feed, adhesively joining the pellets to the surface of the object, and spraying a plastic material over and between the applied pellets.

4. The method of applying mosaic to a curved surface, including the steps of rotating an object having an exterior curved surface, feeding pellets in a single file stream to the surface of the object, adhesively attaching the pellets to said surface, controlling the ultimate weight of the pellet clad object by the spacing of the applied pellets, and coating the applied pellets with a matrix.

5. The method of applying mosaic to a curvate surface, including the steps of rotating an object having a curvate surface, feeding pellets in a stream to the surface of the object for application thereto in a direction circumferentially of the rotating object, causing relative movement longitudinally of the object between the object and point of pellet feed, adhesively joining the pellets to the surface of the object, covering the applied pellets and filling the spaces therebetween with a matrix, and curing the matrix.

6. The method of applying mosaic to a generally cylindrical object, including the steps of feeding pellets onto one side of a double-faced adhesive tape, and spirally winding the tape around the object.

7. The method of applying mosaic to a generally cylindrical object, including the steps of feeding pellets onto one side of a double-faced adhesive tape, and spirally winding the tape around the object, and covering the adhesively held pellets with a plastic material.

8. The method of making a fragmentation warhead, including the steps of rotating a hollow shell, feeding cubical metallic pellets in a stream to the external surface of said shell, adhesively attaching the pellets to the shell, covering the pellets and filling the spaces therebetween with a matrix, and then applying a thin metal cover over the applied pellets.

9. The method of making a fragmentation warhead, including the steps of rotating a hollow shell, feeding cubical metallic pellets in a stream to said shell, adhesively attaching the pellets to the shell, covering the pellets and filling the spaces therebetween with a matrix, curing the matrix, and spinning an aluminum cover tightly over the applied pellets and turning in the cover ends over the pellets at each end of the shell.

10. Apparatus for applying mosaic to the surface of an object, including a base, a movable carriage on said base, head and tail stocks on said carriage to support the object, a feed chute leading toward the object, feeding means to continuously advance pellets in line along said chute from a source of supply, guiding means to cause a strip of double-faced adhesive tape to move along said chute beneath the pellets, said tape having the upper adhesive surface exposed and a temporary covering strip over the lower adhesive face, pressure means to unite the pellets to the exposed face of the tape, pull means to remove the temporary covering strip from the underface of said tape at the end of the chute, drive means to move said carriage, and guiding and pressing means to adhere the pellet bearing tape to the object.

11. Apparatus for applying mosaic to the surface of an object, including a base, a movable carriage on said base, head and tail stocks on said carriage to support the object, a feed chute leading toward the object, a feed screw to laterally move said carriage by the end of said chute, drive means to actuate said feed screw and rotate the object, guide means to direct a strip of double-faced adhesive tape along said chute, feed means to pass a stream of pellets along said chute over the exposed upper face of said tape, pressure means to secure the pellets on the tape, and other pressure means to press the opposite adhesive face of the tape onto the object as it rotates to spirally wind the pellet carrying tape around the object.

12. Apparatus for applying mosaic to the surface of an object, including a base, a movable carriage on said base, head and tail stocks on said carriage to support the object, a feed chute leading toward the object, a feed screw to alterally move said carriage by the end of said chute, drive means to actuate said feed screw and rotate the object, a vibrator to align pellets and move the same in a stream along said chute to the object, adhesive supplying means to apply adhesive between the pellets and the object, and guiding means acting on the pellets as they reach the object to secure said pellets to the rotating object in a spiral line therearound.

13. Apparatus for applying mosaic to the surface of an object, including a base, a movable carriage on said base, head and tail stocks on said carriage to support the object, a feed chute leading toward the object, a feed screw to laterally move said carriage by the end of said chute, drive means to actuate said feed screw and rotate the object, means to supply pellets in alignment to said chute and thence to the object, adhesive supply means, and pressure means acting against the pellets on said object to adhesively attach the stream of pellets emanating from said chute to the surface of the object with adhesive from said supply means.

14. Apparatus for applying mosaic to the surface of an object, including object supporting means, drive means to rotate the object on said supporting means, assembly and feed means to align and secure pellets on one adhesive surface of a double-faced adhesive tape and advance the tape toward the object, and pressure and guide means to secure the other adhesive face of the tape to the object to be wound therearound as the object is rotated.

15. Apparatus for applying mosaic to the surface of an object, including assembling means arranged to align pellets and secure them to an exposed surface of a double-faced adhesive tape, carrying a temporary cover on the other surface, pull means to strip the cover and expose the other surface of the tape, rotary supporting means to carry an object to which the end of the tape is secured by the adhesive on the other surface, and drive means to rotate said supporting means and also translate the same to wind the tape and pellets spirally around the object.

16. Apparatus for applying mosaic to the surface of an object, including assembling means arranged to align pellets and secure them to an exposed surface of a double-faced adhesive tape, carrying a temporary cover on the other surface, pull means to strip the cover and expose the other surface of the tape, rotary supporting means to carry an object to which the end of the tape is secured by the adhesive on the other surface, and drive means to rotate said supporting means and also translate the same to wind the tape and pellets spirally around the object, an aligning blade acting against the side of the line of pellets to force it sidewise against the previous lap, and a pressure roller acting on top of the line of pellets to insure good adhesive union between the tape and object.

References Cited

UNITED STATES PATENTS

| | | | |
|---|---|---|---|
| 2,681,637 | 6/1954 | Simpson | 154—122 |
| 2,527,134 | 10/1950 | Johnson | 117—18 |
| 2,949,689 | 8/1960 | Vida | 41—23 |
| 1,379,160 | 5/1921 | Benson | 41—23 |
| 2,972,949 | 2/1961 | MacLeod | 102—67 |
| 2,933,799 | 4/1960 | Semon | 102—67 X |
| 2,709,864 | 6/1955 | Galbrandsen | 41—23 X |
| 2,458,576 | 1/1949 | Etten | 102—67 X |

WILLIAM D. MARTIN, *Primary Examiner.*

PAUL F. ATTAGUILE, *Assistant Examiner.*